Figure 1:
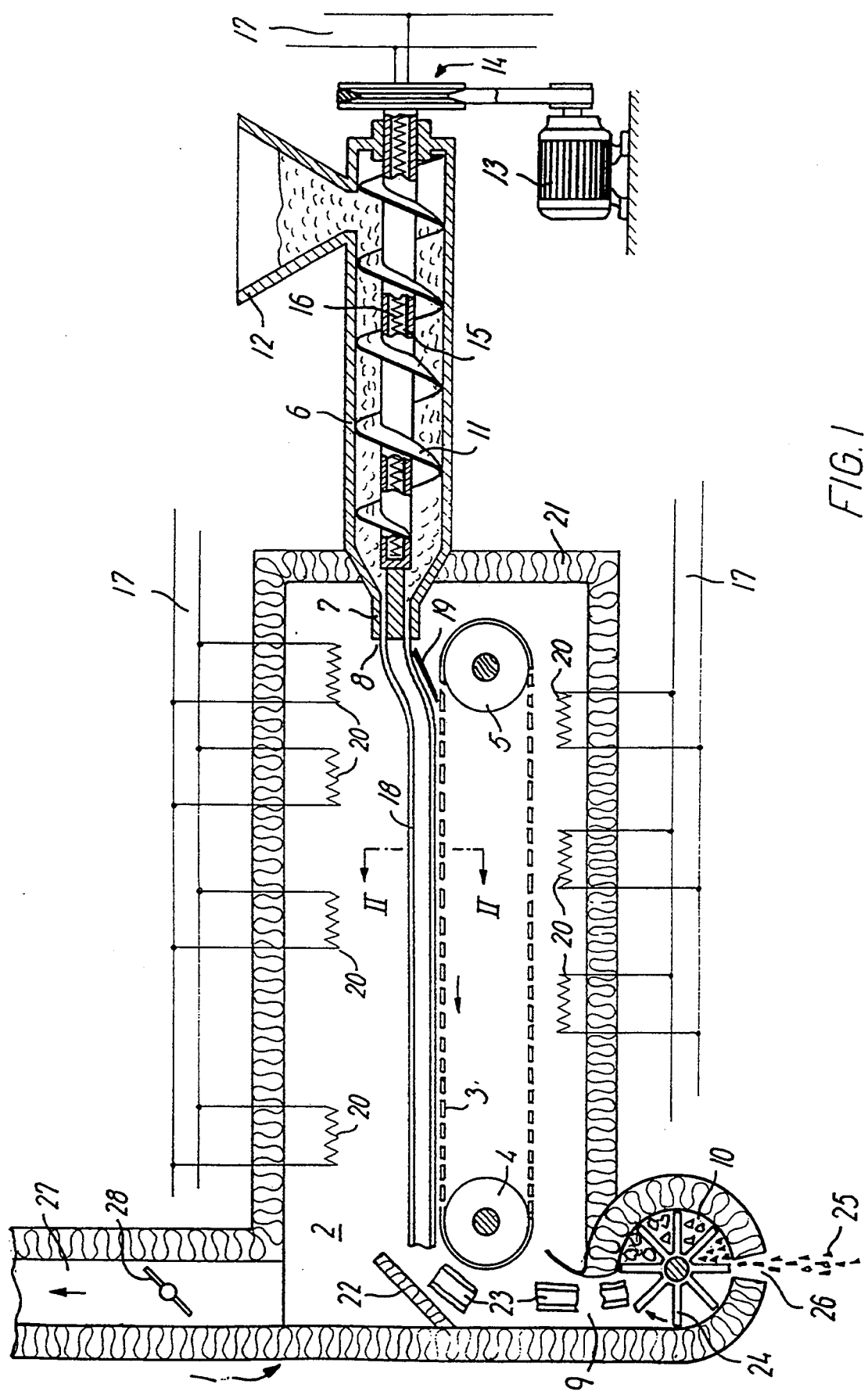

United States Patent [19]

Bernes et al.

[11] Patent Number: 5,373,647
[45] Date of Patent: Dec. 20, 1994

[54] METHOD AND A SYSTEM FOR DRYING SLUDGE

[75] Inventors: Steen Bernes, Hjallerup; John R. Jensen, Rungsted Kyst, both of Denmark

[73] Assignee: FLS Industries A/S, Valby, Denmark

[21] Appl. No.: 958,354

[22] PCT Filed: Jun. 27, 1991

[86] PCT No.: PCT/DK91/00175
§ 371 Date: Feb. 8, 1992
§ 102(e) Date: Feb. 8, 1992

[87] PCT Pub. No.: WO92/00250
PCT Pub. Date: Jan. 9, 1992

[30] Foreign Application Priority Data
Jun. 28, 1990 [DK] Denmark .................. 1562/90

[51] Int. Cl.$^5$ .................................. F26B 7/00
[52] U.S. Cl. ........................... 34/382; 34/385; 34/420; 34/449; 34/60; 34/182; 34/183
[58] Field of Search .................. 34/179–183, 34/184, 12, 151, 152, 60, 61, 39, 380–382, 385, 419–421, 443, 444, 449, 468, 68, 73, 618, 619, 623

[56] References Cited

U.S. PATENT DOCUMENTS

| | | | |
|---|---|---|---|
| 2,439,384 | 4/1948 | Fetzer | 34/12 X |
| 4,244,287 | 1/1981 | Maffet | 34/12 X |
| 4,756,092 | 7/1988 | Anderson | 34/39 X |
| 4,962,592 | 10/1990 | Orizand | 34/60 X |

FOREIGN PATENT DOCUMENTS 2227230 11/1974 France .

*Primary Examiner*—Denise L. Gromada
*Attorney, Agent, or Firm*—Darby & Darby

[57] ABSTRACT

A method and a system serve to completely or partially dehydrate sludge by evaporation which originates from e.g. sewage. The sludge is dried with addition of heat in a drying chamber (2), the sludge being transported on an endless travelling grate (3) from an inlet opening (8) in the drying chamber (2) to a discharge opening (9) in it. The sludge is deposited on the grate in a plurality of juxtaposed sludge strings (18) by means of an extruder (6), in which the sludge is preheated to almost 100° C. prior to extrusion. The extruded strings (18) are then heated with such an intensity that the water in the sludge immediately begins to boil, and that a zone of preferably saturated water steam is formed at any rate in the immediate vicinity of the sludge. This provides a light and porous, dried sludge product which is in no way either burnt or scorched, and which constitutes excellent fuel as well as excellent compost. The system has a simple and compact construction and is inexpensive to produce, just as it works at moderate operation costs.

25 Claims, 3 Drawing Sheets

METHOD AND A SYSTEM FOR DRYING SLUDGE

The invention concerns a method of wholly or partly dehydrating sludge by evaporation which originates from e.g. sewage, said sludge being transported on a travelling grate from an inlet to a discharge opening in a drying chamber with addition of heat.

To protect nature and to prevent environmental damage very strict requirements are made today with respect to the purification of the sewage which is discharged to a recipient from municipal or industrial purification systems. An essential part of the required purification consists in passing the sewage through relatively large settling basins or tanks, in which the sewage then stays so long and under so quiet conditions that its content of sewage settles, or as is more common today, is subjected to mechanical treatment during which the sludge is dehydrated to a suitable extent by means of e.g. centrifugation.

In some cases, the sludge, which generally mainly consists of organic materials, may be spread directly over agricultural areas and be of use here as a fertilizer for the grown plants, but this will frequently not be possible since the sludge may have a content of substances which are harmful to animals and humans, and it is consequently not acceptable that these are included in the food chain via the crops in question.

Accordingly, methods have been developed for drying the sludge and making it useful as fuel or compost. For the latter purpose, additional heat treatment frequently takes place in connection with the drying to free the sludge of its content of harmful substances to the necessary extent.

It is preferred in many cases to initiate drying of the sludge directly in the wet and tacky state in which the sludge is conveyed to the drying system. In such a known method the sludge is thus thrown from e.g. a rotating wheel in countercurrent to a hot stream of air in a more or less finely divided form, so that the sludge rapidly dries to a powder and/or granulate. This method is extremely efficient, but on the other hand uneconomic in operation since it necessarily requires large amounts of air which must first be heated and is then discharged to the atmosphere, where the air per se, without a preceding expensive and cumbersome separation and filtration process, may constitute a source of environmental pollution since it very easily entrains pulverized sludge from the drying process.

WO 88/02284 discloses a method of drying sludge in a rotary kiln. In this case, an extruder is inserted in front of the rotary kiln, said extruder kneading the sludge with a separate binder and producing pellets from the kneaded mixture which are supplied to the rotary kiln and burnt to a solid, almost ceramic-like form which is suitable for disposal. However, the method cannot be used for producing pellets which can be burnt or composted.

Further, DE Offenlegungsschrift 3 531 748 discloses a method where the sludge is dried on a conveyor belt in a traverse kiln. In order that the sludge can be treated in this manner, the wet sludge is mixed in a suitable proportion with already dried sludge to form a sufficiently loose and friable material which can be distributed on the grate without sticking to it. During drying the sludge shrinks greatly already from the beginning and will hereby form a granulate with a dense and compact structure, which impedes the biological processes which are subsequently to take place during composting. The granulate cannot be used as a fuel either, since the end product has a much to high water content for this purpose. To this should be added that the system is relatively uneconomic in operation, since a considerably portion of the already dried sludge must constantly be recirculated and mixed with new and wet sludge.

Moreover, WO 90/09967 discloses a device for dehydration of sewage sludge, which is subjected to relatively high thermal impacts during transport through a plurality of augers. During this transport, the sludge is constantly rotated about, while relative movement takes place between the sludge and the augers, whereby the material, which is initially in a viscous state, is subjected to compressive forces counteracting the formation of gas pores and channels. This device cannot therefore dehydrate sludge in the form of stable, relatively thin-walled strings, which are immediately heated through the entire cross-section to such an extent that the water content of the sludge begins to boil, thereby imparting to the dehydrated sludge a light and porous structure, while the rapid steam discharge through the resulting gas channels serves to prevent the sludge from baking on to the transport means, e.g. a travelling grate, on which the sludge rests immovably during transport.

The object of the invention is to provide a method of the type stated in the opening paragraph, which, with less current and investment expenditure, more efficiently and with less environmental impact than known before, is capable of drying wet and sticky sludge originating from e.g. sewage, and thereby converting this sludge to a dry and uniform porous product which constitutes a valuable fuel or valuable compost.

This is achieved in that the method of the invention is characterized in that the heat is added with such an intensity that the water in the sludge immediately begins to boil, and that a zone of preferably saturated water steam is formed at any rate in the immediate vicinity of the sludge. This entails that the water content of the sludge is rapidly expelled to the surface as either water or steam, whereby a network of pores and channels is left in the dried sludge which hereby maintains its original volume or even increases it. The sludge hereby obtains a structure which is extremely suitable both when the sludge is to be used as fuel and when it is to be used as compost. During drying, there is no risk of the sludge getting burnt or scorched, since the surrounding steam zone keeps all oxygen spaced from the sludge, while the rapid discharge of water and steam from the sludge prevents the sludge from adhering to the transport means in the drying chamber. Because of the conditions described, drying may take place at an unprecedented rate and by means of a structure which is very compact and inexpensive with respect to the known systems.

According to the invention, the sludge may advantageously be conveyed to the drying chamber by means of an extruder, which may moreover be heated such that the sludge has a temperature of up to 100° C. already when it is deposited on the conveyor belt. The water content of the sludge hereby immediately begins to boil after the sludge has entered the drying chamber, so that the above-mentioned advantages are obtained already from the commencement of the drying process. This is of particularly great importance to prevent the sludge from initially adhering to or baking on to the transport means.

According to the invention, in cross-section the sludge strings deposited by the extruder on the transport means have a relatively large peripheral length of preferably at least 3 times the smallest transverse dimension of the cross-section to make the water content boil rapidly to promote evaporation. It is particularly advantageous when each string is provided with longitudinal ribs.

When the sludge is heated by means of the generated heat from a combustion process, an economic advantage will be obtained according to the invention when the combustion air for this process is first passed through the drying chamber, whereby the temperature and flow of the air are additionally controlled such that a zone of preferably saturated water steam is constantly left around the sludge.

Advantageously, by connecting the drying chamber with a condenser and cooling its contents to a temperature below 100° C., it is possible according to the invention successively to remove the generated steam in the drying chamber and to use the heat content of this steam in e.g. a district heating system.

The invention also concerns a system which serves to perform the above-mentioned method, and which comprises a drying chamber with an inlet opening and a discharge opening arranged at their respective ends of said chamber, as well as an endless travelling grate arranged in the drying chamber for transporting the sludge to be dried from one opening to the other in the drying chamber with simultaneous addition of heat from a heat releasing means.

This system is characterized according to the invention in that it moreover comprises an extruder which has a mouth-piece arranged relatively closely spaced upwardly from the feed end of the travelling grate, as well as one or more heat releasing means which are arranged around the extruder and/or in its transport means, and which are so adapted that the sludge leaves the mouthpiece of the extruder with a temperature which is preferably between 80° and 100° C., in particular between 95° and 100° C.

Figure 2:
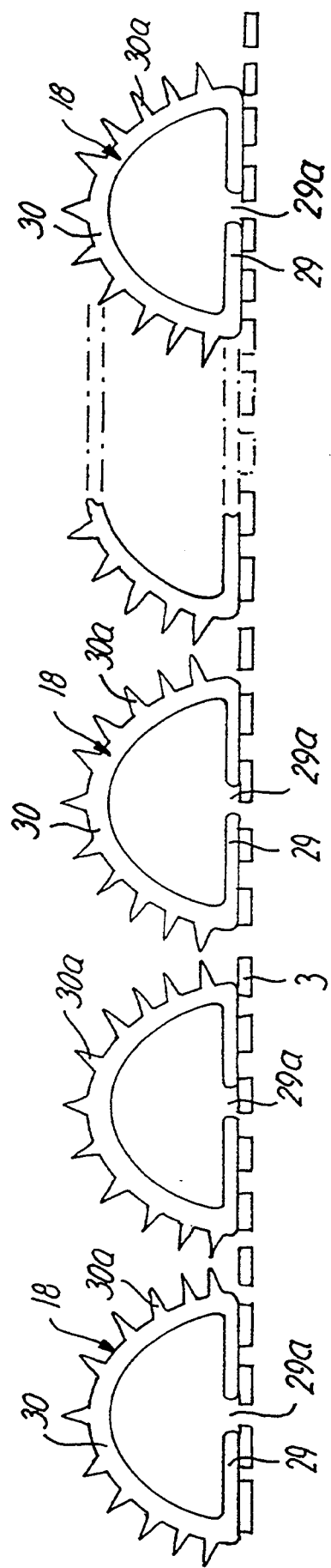
Figure 3:
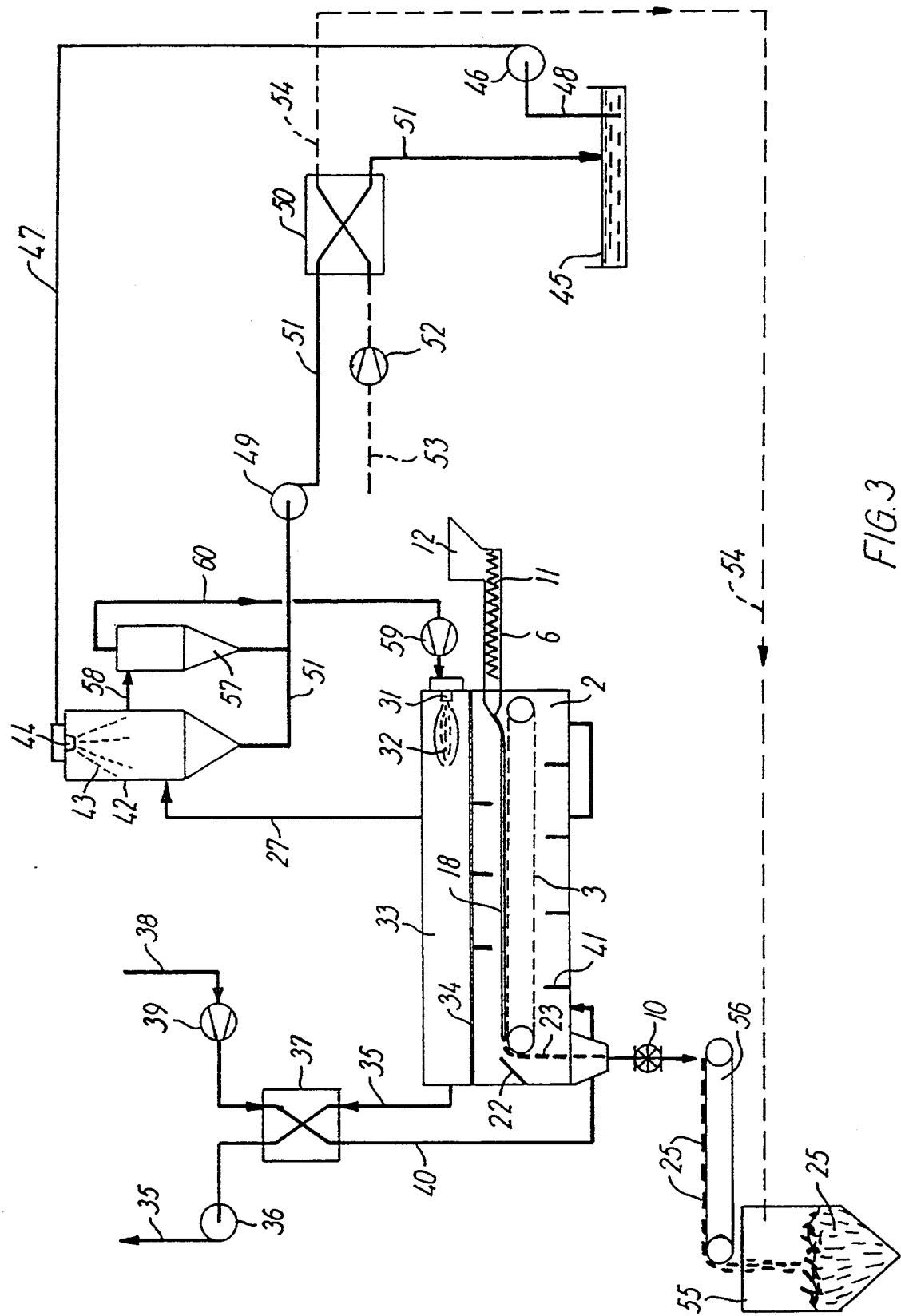

The invention will be explained more fully by the following description of embodiments which are just given by way of example, with reference to the drawing, in which FIG. 1 schematically shows a first embodiment of a system according to the invention, FIG. 2 is an enlarged section along the line II—II in FIG. 1, and FIG. 3 schematically shows a second embodiment according to the invention.

FIG. 1 schematically shows a drying system which is generally designated 1. The drying system substantially consists of a drying chamber 2 with an endless travelling grate 3 running in the direction of the arrow around two rollers 4 and 5, of which the first roller 4 is driven by means of a motor (not shown), and the other roller 5 is idling. The drying system moreover comprises an extruder 6 with a mouthpiece 7 which protrudes through an inlet opening 8 in the drying chamber 2 directly above the feed end of the travelling grate 3. The opposite end of the drying chamber is formed with a discharge opening 9 which accommodates a sluice 10, whose importance will be described below.

The extruder 6, which comprises at least one conveyor worm 11, receives the sludge in a funnel 12, to which the sludge is conveyed from the sludge basin or tank by means of a pump and/or transport system (not shown), during which the sludge is optionally dehydrated to a solid content of between 15 and 40% in a manner known per se, which will therefore not be mentioned in greater detail here. The conveyor worm 11 is driven by a motor 13 via a transmission 14 and, in the shown embodiment, is provided with an axially extending cavity 15 which accommodates an electric heating member 16 which is connected to a power supply 17.

When the system is in operation, the wet sludge is conveyed from the funnel 12 forwardly through the extruder to the mouthpiece 7 by the rotating conveyor worm 11, the sludge being heated during this process to almost 100° C. by the heating member 16. This heating in connection with the simultaneous mechanical stirring imparted to the sludge by the conveyor worm, entails that the sludge will be pliable and easy to transport and extrude, and that the extruded string 18 has exactly the same temperature over its entire cross-section when it leaves the mouthpiece 7.

Then the string 18 slides via an optional chute 19 down to the travelling grate 3, which runs with a speed adapted to the extrusion rate, such that the string is continuously moved towards the opposite end of the conveyor belt. The extruded string 18 is heated during this by means of a plurality of electric heating members 20 which, like the heating member 16, are connected to the power supply 17. As shown, heating members 20 are provided both above and below the extruded string 18, and the heat released by the heating members is most intensive initially where the need for heat to evaporate the water content of the sludge is greatest. To avoid loss of heat to the surroundings, the drying chamber is exteriorly provided with a heat insulating jacket 21.

Electric heating members are used in this case for the heating of the sludge in both the extruder and the drying furnace, but this is just an example of course, since it is possible to use any suitable heating source instead, such as the flue gases from a combustion furnace or gas or oil burners. However, in all cases the thermal capacities must be adjusted such that the temperature of the sludge in the extruder is brought almost to the boil before the sludge leaves the mouthpiece, following which the water content in the extruded string immediately begins to boil violently over the entire cross-section of the string, and this state is maintained until the string has reached the other end of the drying furnace.

Several remarkable advantages are obtained by means of the above-mentioned special combination of heating the sludge from the moment this is supplied to the extruder and until it leaves the travelling grate in a dried state. Thus, the sludge does not adhere to and/or bake on to the travelling grate, as might otherwise be expected, because the water and steam, which are rapidly expelled to the surface of the sludge because of the boiling, settle as a protective layer between the sludge surface and the grate. Another considerable advantage is that the sludge will not be burnt or scorched, since the strong boiling and evaporation forms a zone of saturated water steam which settles around the string of sludge and keeps all oxygen spaced from it. The strong boiling along the entire drying zone in the drying chamber also entails that the water and the steam, which are expelled to the surface of the string by the steam pressure in the sludge, form a finely branched network of pores and channels which remain in the finished product, which will therefore be light and porous with excellent properties both as fuel and compost.

Having passed the drying zone, the now dry string leaves the travelling grate, and during this movement the string impinges on an inclined abutment plate 22 which breaks the relatively fragile string into suitable pieces 23. However, in some cases the string may already have been broken to a certain extent because of i.a. thermal stresses. The broken pieces 23 fall directly down into the sluice 10, which has a mill 24 that rotates in the direction of the arrow in operation and thereby crushes the pieces 23 additionally to bits 25 which fall through a lower opening 26 in the sluice 10. These bits 25 of dried sludge can now be used as fuel in e.g. a combustion system or as compost, if the sludge is free of harmful components, such as heavy metals and poisonous substances.

Considerable amounts of steam are generated during drying, which are successively removed via a vent pipe 27 with a damper 28 to regulate the steam pressure in the actual drying chamber. The steam contains a considerable amount of energy which can be turned to account via a heat exchanger in e.g. a district heating system.

The embodiment shown in FIG. 1 is of a very simple and inexpensive structure, which, however, is nevertheless extremely efficient. The streams of energy generated because of the drying are not recycled in a closed circuit in the system shown, but are discharged from it and utilized in a greater system, which may e.g. be a district heating system which is supplied with heat from a municipal combustion system. The flue gases from this may be used as a heat energy source for the drying process, the flue gases still liberating heat and the generated steam from this for heating the water of the district heating system, and the dried sludge as fuel in the combustion system. An excellent operation economy at relatively modest initial costs is obtained by means of such a combination between the shown drying system and an already existing larger energy system.

FIG. 2 is a cross-sectional view of a fragment of the travelling grate 3 with a plurality of extruded strings 18 which are disposed closely to each other. Each of these strings is tubular and has a base 29 by which the string rests on the grate, and an upper portion 30 which arches above the base in e.g. a cycloide shape, which ensures that the weight of the spring can only apply compressive stresses to the at any rate initially very weak wall of the upper portion. As shown, the upper portion 30 is moreover provided with a plurality of longitudinal ribs 30a, which serve to considerably increase the surface of the extruded string to promote evaporation. The arched shape of the upper portion moreover entails that the radiant heat from the heat sources in the drying chamber can reach substantially all portions of the outer surface of the string. In this case, the water can also advantageously evaporate from the inner surface of the string, since the generated steam can escape through a longitudinal gap 29a in the base 29.

Of course, the shape of the string cross-section shown in FIG. 2 is just an example, since the cross-section may have any other expedient shape within the scope of the invention. Thus, the cross-section may be four-sided, oval, round or star-shaped, just as it may optionally be solid or hollow and does not have to be provided with longitudinal ribs. However, under any circumstances, a large surface with respect to the area of the cross-section is desired.

FIG. 3 schematically shows a second embodiment of the drying system, where parts corresponding to those shown in FIG. 1 are provided with the same reference numerals. The actual drying system is substantially constructed in the same manner as described in connection with FIG. 1 and operates in the same manner, but in this case the drying system is additionally provided with a heat recovery system, and the primary heat for the drying process is added by means of one or more gas burners 31 which burn with a flame 32 in a separate combustion chamber 33 spaced from the drying chamber 2 by means of a partition 34, from which the heat from the gas flame 32 is transferred indirectly as radiant heat to the extruded string 18.

The flue gases from the combustion of the gas in the combustion chamber 33 is drawn out of this and discharged to the atmosphere by means of a ventilator 36 via a vent pipe 35 in which a cross heat exchanger 37 is inserted. The necessary amount of air for the combustion process is likewise added through this cross heat exchanger 37, but in counterflow to the hot flue gases so that the heat energy of these is utilized for heating the combustion air. As shown, this is introduced by means of a blower 39 and conveyed, as mentioned, through the cross heat exchanger 37 and further on from this via an air channel 40 into the drying chamber 2. This chamber accommodates a plurality of baffle plates 41, which are so arranged that the hot combustion air is caused to pass up and down between the extruded sludge strings 18 before the air leaves the drying chamber 2 via the vent pipe 27. The air absorbs and entrains the steam during this passage which is generated by the evaporation of the water content of the sludge, it being observed in this connection that because of the extremely rapid evaporation process there will still be a cushion of steam close to the surface of the sludge strings to keep the oxygen of the air spaced from the strings, so that these are not burnt or scorched. A contributory reason of this advantageous circumstance is that a network of pores and channels is formed already from the beginning of the evaporation process which rapidly convey water and steam to the surface also at the end of the evaporation process. As appears, the heat content in the preheated combustion air effectively contributes to heating the sludge strings and promoting the evaporation of the water content of these, while the air convection equalizes differences in temperature between surface portions which receive different amounts of radiant heat from the partition 34 because of their location.

Having passed the drying chamber 2, the air may contain other gases in addition to water steam which are released by heating of the sludge strings. The air thus mixed is then conveyed via the vent pipe 27 to a condenser 42 in which the air is cooled down to a temperature of slightly below 100° C., so that the water steam is condensed to generate a slight negative pressure in the drying chamber 2 to ensure that poisonous or malodorous gases from the drying process do not escape through possible leaks in the drying chamber to the surroundings.

In the shown case, cooling of the air takes place by means of a water mist 43 which is ejected by an atomizer nozzle 44, which is supplied with water under pressure via a water conduit 47 by a pump 46, which sucks up the necessary water from a sewage basin 45 by means of a suction line 48. The cooling water is then conveyed together with the condensed water steam by means of a pump back to the sewage basin 45 again via a water conduit 51, which accommodates a cross heat exchanger 50. An air flow from an air inlet 53 is moreover passed through the cross heat exchanger 50 by means of a blower 52 in co-current with the warm cooling and condensed water which thereby releases its heat content to the air, which, in heated state, is conveyed further on via an air channel 54 to a storage and drying silo 55, which receives the resulting dried sludge in bits from the sluice 10 by means of a conveyor 56. The heat from the condensed water is hereby utilized for after-drying the sludge so that the end product will be very dry and suitable for use in particular as a fuel.

After the steam content of the air has condensed in the condenser 42, the air is conveyed further on via an air channel 58 to a cyclone drop separater 57 by means of a blower 59, which is inserted in an air channel 60 connected with the upper part of the cylone drop separater 57. Water drops which might have been entrained by the air flow from the condenser 42, are now separated in the cyclone drop separater 57 and are conveyed via the water conduit 51 and the cross heat exchanger 50 together with the cooling and condensed water to the sewage basin 45. In addition to the amount of sewage which is thus recirculated in the above-mentioned circuit, fresh sewage from the drying process will of course continuously be supplied to the sewage basin 45. However, it has been found that this sewage is so clean that it can readily be used for several different industrial purposes or for watering of fields.

As appears, the steam content of the air is thus removed in the condenser 42 and water drops, if any, in the cyclone drop separater 57. However, the air may still have a content of hydrocarbons and other non-condensable gases. Since the air is finally fed to the gas burner 31 by means of the blower 59 as combustion air, these gases are incinerated because of their high temperatures which occur during the combustion. The air is then completely cleaned of hydrocarbons and malodorous gases and can readily be discharged to the atmosphere. If desired, a catalyst and optionally a soot separater may additionally be inserted in the vent pipe 35 to ensure that even the strictest threshold requirements are observed.

It is mentioned above how the sludge is preheated in the extruder, and the advantages involved hereby for the overall drying process have been explained. However, the essential feature is that the sludge is fed to the drying chamber with a relatively high temperature, and the sludge may therefore just as well be preheated before reaching the extruder, e.g. during transport to it. In this case the extruder is expediently insulated to keep the temperature of the preheated sludge at a desired level. For the preheating, it is then possible to use e.g. the flue gases which are discharged from the cross heat exchanger 37, and which are preferably discharged with a temperature of above 100° C. to avoid deposits of corrosive condensates. In a particularly simple and advantageous embodiment of the invention in this connection, the hot flue gases are caused to bubble directly up through the sludge which will thereby advantageously serve as a regular after-filter for the flue gases.

EXAMPLE

A tubular drying chamber with a length of 3 m and a diameter of 0.6 m was used in a test. The upper half of the tubular wall formed a partition to a semicircular combustion chamber which has heated by means of a gas burner. A conveyor belt of almost the same length as the drying chamber and with a width of 0.5 m was placed in the centre of the drying chamber. A round sludge strings were evenly distributed over the width of the belt by means of an extruder which had a mouthpiece with 57 nozzles with a diameter of 6.5 mm. The flue gases from the combustion were discharged directly to the atmosphere from the combustion chamber end nearest to the extruder, while the generated water steam from the drying process was sucked out of the drying chamber to the atmosphere from the opposite end.

The extruded amount of sludge was 0.8 kg per min., and the speed of the belt was adapted to the rate of 0.6 m per min. at which the sludge left the mouthpiece of the extruder, so that the complete drying time was about 5 min. The temperature in the drying chamber was 435° C., and the discharge temperature of the flue gases from the combustion chamber was 550° C. After drying, the sludge was removed from the drying chamber via a rotating gate in which the strings of sludge were broken down into small pill-shaped pieces which were found to have a dry matter content of 90%. This is sufficient if the dried sludge is to be used e.g. for composting, and if it is to be used as fuel, additional water can easily be removed to the necessary extent in a storage and drying silo.

As appears, the test system have a capacity of 48 kg of wet sludge per hour with an evaporation capacity of 25.6 kg of water per $cm^2$ conveyor belt.

During drying no form of volume shrinkage was observed, and the resulting dried product was found to have a light and porous structure and was in no way either charred or scorched in spite of the high temperature impact in the drying chamber. Because of the porous structure the dried sludge product could easily be converted biologically to compost, just as the product was found to be an excellent fuel.

Although the method and the system of the invention have been described in the foregoing on the assumption that it was sewage sludge that was to be dried, the method and the system can be used equally well and with the same advantages for drying many other types of sludge which might occur in connection with e.g. industrial processes, without departing from the scope of the invention.

We claim:

1. A method of dehydrating sludge, comprising the steps of:
    (a) feeding sludge in the form of one or more elongate strings into one end of a drying chamber,
    (b) transporting said one or more elongate strings through said drying chamber, at the same rate they are fed into said drying chamber, to a discharge opening disposed opposite said one end,
    (c) heating the interior of said drying chamber to a temperature sufficient to cause water contained in the sludge to boil substantially immediately upon entry of said one or more elongate strings into said drying chamber, whereby to form steam in the immediate vicinity of said one or more elongate strings, and continuing to heat said one or more elongate strings during their transport through said drying chamber, and
    (d) discharging dehydrated sludge through the discharge opening of said drying chamber.

2. The method of dehydrating sludge according to claim 1, wherein the cross section of each of said one or more elongate strings has a peripheral dimension at least three times as great as its smallest transverse dimension.

3. The method of dehydrating sludge according to claim 1, comprising the further step of preheating said sludge before it is fed into the inlet opening of said drying chamber to a temperature in the range between 80° C. and 100° C.

4. The method of dehydrating sludge according to claim 1, wherein said sludge is fed into the inlet opening of said drying chamber through an extruder for shaping said sludge into one or more elongate strings.

5. The method of dehydrating sludge according to claim 4, wherein said extruder preheats said sludge to a temperature in the range between 80° C. and 100° C.

6. The method of dehydrating sludge according to claim 4, wherein the cross section of each of said one or more elongate strings has a peripheral dimension at least three times as great as its smallest transverse dimension.

7. The method of dehydrating sludge according to claim 4, wherein each of said one or more elongate strings has a plurality of longitudinally extending ribs formed on its outer perimeter for increasing the area thereof exposed to heat in said drying chamber.

8. The method of dehydrating sludge according to claim 7, wherein said one or more elongate strings each has a peripheral dimension at least three times as great a its smallest transverse dimension.

9. Apparatus for dehydrating sludge comprising:
an elongate drying chamber having an inlet opening and a discharge opening at respective opposite ends thereof;
an endless traveling grate disposed within said drying chamber arranged for transporting sludge to be dried from the inlet opening to the discharge opening of said drying chamber;
extruder means spaced above the inlet opening end of said traveling grate for feeding sludge in the form of one or more elongate strings onto the inlet end of said grate at a rate substantially equal to the rate of travel of said traveling grate such that said one or more strings remain intact during transport through said drying chamber, said extruder means including heating means in heat-exchanging relationship therewith for preheating the extruded sludge to a temperature in the range between 80° C. and 100° C.;
means for supplying heat to said drying chamber at a temperature sufficiently high as to cause water contained in the sludge to boil substantially immediately upon entry of a string into the drying chamber whereby to form steam in the immediate vicinity of the string of sludge for preventing the sludge from sticking to said traveling grate and to further dry said sludge as it is transported through said drying chamber; and
means arranged in the discharge opening of said drying chamber for dividing the dried string or strings of sludge into smaller pieces and removing same from said drying chamber.

10. Apparatus for partially or completely dehydrating sludge which originates from sewage, for example, said apparatus comprising:
a drying chamber having an inlet opening and a discharge opening arranged at respective opposite ends thereof;
an endless travelling grate arranged in said drying chamber for transporting sludge to be dried from the inlet opening to the discharge opening of said drying chamber with simultaneous addition of heat from one or more heat releasing means;
extruder means having a mouthpiece relatively closely spaced above the feed end of said travelling grate for feeding sludge onto said travelling grate; and
one or more heat releasing means arranged around said extruder means and/or its transport means adapted to cause the sludge to leave the mouthpiece of said extruder with a temperature which is in the range between 80° C. and 100° C.

11. Apparatus according to claim 10, wherein the temperature of the sludge as it leaves said extruder is in the range between 95° C. and 100° C.

12. Apparatus according to claim 10, wherein said apparatus further comprises a steam condenser connected with said drying chamber which contains cooling means for keeping the temperature in the condenser below 100° C.

13. Apparatus according to claim 10, wherein said extruder feeds said sludge onto said travelling grate in one or more strings, and
wherein said apparatus further comprises a rotatable mill arranged in the discharge opening of said drying chamber for dividing the dried sludge strings into smaller pieces and removing same from said drying chamber.

14. Apparatus for dehydrating sludge comprising:
an elongate drying chamber having an inlet opening and a discharge opening at opposite ends thereof;
an endless traveling grate arranged within said drying chamber for transporting sludge to be dried from the inlet opening to the discharge opening of said drying chamber;
extruder means disposed above the inlet end of said traveling grate for feeding sludge in the form of one or more elongate strings onto the inlet end of said grate at a rate substantially equal to the rate of travel of said traveling grate;
means for supplying heat to said drying chamber at a temperature sufficiently high as to cause water contained in the sludge to begin to boil substantially immediately upon entry of a string into the drying chamber whereby to form steam in the immediate vicinity of the string of sludge for preventing the sludge from sticking to said traveling grate and to further dry said string as it is transported through said drying chamber.

15. Apparatus for dehydrating sludge according to claim 14, wherein said extruder means includes heating means in heat-exchanging relationship therewith for preheating sludge extruded therefrom to a temperature in the range between 80° C. and 100° C.

16. Apparatus for dehydrating sludge according to claim 14, wherein said apparatus further comprises a rotatable mill arranged in the discharge opening of said drying chamber for dividing the dried sludge strings into smaller pieces and removing same from said drying chamber.

17. Apparatus for dehydrating sludge according to claim 14, wherein said extruder means include extruders which form a plurality of longitudinally extending ribs on the outer perimeter of each of said one or more elongate strings for increasing the area thereof exposed to heat in said drying chamber.

18. Apparatus for dehydrating sludge according to claim 14, wherein said apparatus further comprises steam condenser means connected to said drying chamber and including cooling means for keeping the temperature of said steam condenser means below 100° C., whereby to condense steam from said heated sludge and to create a slight negative pressure in said drying chamber for preventing malodorous or poisonous gases from escaping from said drying chamber.

19. A method of partially or completely dehydrating sludge which originates from sewage, for example, comprising the steps of:
  feeding said sludge in one or more strings by means of an extruder to a drying chamber;
  transporting said one or more strings on a traveling grate from an inlet to a discharge opening in said drying chamber with addition of heat with such an intensity that the water in the sludge immediately begins to boil and that a zone of preferably saturated water steam is formed at any rate in the immediate vicinity of the sludge; and
  discharging completely dehydrated or partially dehydrated sludge through the discharge opening of said drying chamber.

20. A method according to claim 19, wherein the generated steam is cooled in a condenser connected with said drying chamber to a temperature of below 100° C.

21. A method according to claim 19 or claim 20, wherein heating takes place by means of heat generated by a combustion process, the combustion air for which is first conveyed through the drying chamber with such a temperature that a zone of preferably saturated water steam is constantly left around the sludge.

22. A method according to claim 19, wherein in cross-section each string has a peripheral length at least three times as great as its smallest transverse dimension.

23. A method according to claim 19, wherein each string is provided with longitudinal ribs.

24. A method according to claim 19, wherein said sludge is fed to the extruder in a preheated state.

25. A method according to claim 19, wherein the transport means of the extruder is kept heated for adding heat to the sludge.

* * * * *